United States Patent
Karlsson

(10) Patent No.: US 9,210,629 B2
(45) Date of Patent: Dec. 8, 2015

(54) MULTI-CARRIER STEERING IN RRC STATE CELL_FACH

(75) Inventor: Patrik Karlsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 327 days.

(21) Appl. No.: 13/883,719

(22) PCT Filed: Nov. 11, 2010

(86) PCT No.: PCT/SE2010/051237
§ 371 (c)(1),
(2), (4) Date: May 6, 2013

(87) PCT Pub. No.: WO2012/064242
PCT Pub. Date: May 18, 2012

(65) Prior Publication Data
US 2013/0223410 A1    Aug. 29, 2013

(51) Int. Cl.
H04W 4/00 (2009.01)
H04W 36/06 (2009.01)
H04L 5/00 (2006.01)
H04W 72/04 (2009.01)
H04W 76/04 (2009.01)

(52) U.S. Cl.
CPC ............ H04W 36/06 (2013.01); H04L 5/0007 (2013.01); H04L 5/0091 (2013.01); H04L 5/0098 (2013.01); H04W 72/0486 (2013.01); H04W 72/042 (2013.01); H04W 76/046 (2013.01)

(58) Field of Classification Search
None
See application file for complete search history.

(56) References Cited

U.S. PATENT DOCUMENTS

| | | | | |
|---|---|---|---|---|
| 7,873,051 | B2* | 1/2011 | Hindelang et al. | 370/394 |
| 8,509,076 | B2* | 8/2013 | Reznik et al. | 370/235 |
| 2006/0128394 | A1 | 6/2006 | Turina et al. | |
| 2006/0274712 | A1* | 12/2006 | Malladi et al. | 370/345 |
| 2008/0070584 | A1* | 3/2008 | Kuo | 455/452.1 |
| 2009/0191883 | A1* | 7/2009 | Choi et al. | 455/450 |
| 2009/0196256 | A1 | 8/2009 | DiGirolamo et al. | |
| 2009/0274048 | A1* | 11/2009 | Sambhwani et al. | 370/236 |
| 2009/0274086 | A1* | 11/2009 | Petrovic et al. | 370/312 |
| 2010/0130219 | A1* | 5/2010 | Cave et al. | 455/450 |
| 2010/0151869 | A1* | 6/2010 | Fischer et al. | 455/450 |
| 2010/0195507 | A1* | 8/2010 | Marinier et al. | 370/242 |
| 2010/0278130 | A1* | 11/2010 | Sambhwani et al. | 370/329 |
| 2011/0122783 | A1* | 5/2011 | Lin et al. | 370/252 |

(Continued)

FOREIGN PATENT DOCUMENTS

WO    WO 2009/096877 A1    10/2009

OTHER PUBLICATIONS

International Search Report, PCT/SE2010/051237, Jun. 14, 2011.

(Continued)

*Primary Examiner* — Phirin Sam
(74) *Attorney, Agent, or Firm* — Myers Bigel Sibley & Sajovec, P.A.

(57) ABSTRACT

A method for a user equipment adapted for wireless communication with a base station, comprising, when the user equipment operates in a CELL_FACH state and performs user data transmission over a first carrier: receiving from the base station a message indicative of a second carrier to be used for the user data transmission; and transferring the user data transmission from the first carrier to the second carrier, in response to the message. A method for a base station, a user equipment and base station are also described.

24 Claims, 3 Drawing Sheets

(56) References Cited

U.S. PATENT DOCUMENTS

2012/0026913 A1* 2/2012 Reznik et al. ............... 370/252
2014/0307678 A1* 10/2014 Marinier et al. ............. 370/329

OTHER PUBLICATIONS

Written Opinion of the International Searching Authority, PCT/SE2010/051237, Jun. 14, 2011.
$2^{nd}$ Written Opinion of the International Searching Authority, PCT/SE2010/051237, Feb. 20. 2013.
3GPP TS 25.319, V10.1.0, "$3^{rd}$ Generation Partnership Project; Technical Specification Group Radio Access Network; Enhanced uplink; Overall description; Stage 2 (Release 10)", (Jun. 2010), 77 pp.
3GPP TS 25.331, V8.11.0, "$3^{rd}$ Generation Partnership Project; Technical Specification Group Radio Access Network; Radio Resource Control (RRC); Protocol specification (Release 8)", (Jun. 2010), 1,728 pp.
3GPP TS 25.304, V9.2.0, "$3^{rd}$ Generation Partnership Project; Technical Specification Group Radio Access Network; User Equipment (UE) procedures in idle mode and procedures for cell reselection in connected mode; (Release 9)", (Jun. 2010), 50 pp.
International Preliminary Report on Patentability, PCT/SE2010/051237, May 8, 2013; 15 pp.
Communication pursuant to Article 94(3) EPC, Application No. 10 795,079.2, Aug. 18, 2015.

* cited by examiner

MULTI-CARRIER STEERING IN RRC STATE CELL_FACH

CROSS REFERENCE TO RELATED APPLICATION

This application is a 35 U.S.C. §371 national stage application of PCT International Application No. PCT/SE2010/051237, filed on 11 Nov. 2010, the disclosure and content of which is incorporated by reference herein in its entirety. The above-referenced PCT International Application was published in the English language as International Publication No. WO 2012/064242A1 on 18 May 2012.

TECHNICAL FIELD

The invention relates to wireless communication with a user equipment that operates in a CELL_FACH state.

BACKGROUND

Today, in WCDMA (Wideband Code Division Multiple Access), packet-data traffic is often bursty with occasional periods of transmission activity. From a user perspective it is advantageous to have the HS-DSCH (High-Speed Downlink Shared Channel) and the E-DCH (Enhanced Dedicated Channel) configured to quickly be able to transmit user data. Simultaneously, maintaining the connection in uplink and downlink comes at a cost. From a perspective of the network, there is a cost in uplink interference even in absence of data transmission. From a UE (user equipment) perspective the power consumption is a main concern, even when no user data is received since the UE still needs to transmit on e.g. the DPCCH (Dedicated Physical Control Channel).

To reduce UE power consumption, WCDMA has several RRC (Radio Resource Control) states, such as URA_PCH (URA Paging channel), CELL_PCH (Cell Paging channel), CELL_FACH (Cell Forward access channel) and CELL_DCH (Cell Dedicated Channel), which are all known and described in the prior art. RRC signaling is typically used for moving the UE between the different states.

The lowest power consumption is achieved when the UE is in one of the states URA_PCH and CELL_PCH. Then the UE sleeps and is only occasionally activated to check any paging message. For exchange of user data the UE needs to be moved to the CELL_FACH or CELL_DCH states.

When the UE is in the CELL_FACH state it can transmit some amounts of user data, and the UE monitors common downlink channels for small amounts of user data and RRC signaling. Also, in the CELL_FACH state power consumption is higher than in the URA_PCH or CELL_PCH states, but lower than in the CELL_DCH state. In the CELL_DCH state the UE can transmit the relatively highest amount of user data and/or have the smallest delay, but the power consumption of the UE is then also the highest.

Hence, as implied above, from a transmission/delay perspective it is preferable to keep the UE in the CELL_DCH state. However, one of the states URA_PCH and CELL_PCH is preferred if interference, system resource consumption and/or UE power-consumption should be reduced.

The communication network that the UE is part of, as well as the UE per se, are affected by which state the UE is in, and a number of considerations must be done for obtaining a configuration that is optimal for the network and/or the UE. This issue is addressed e.g. in WO2009/099368 which discloses how a throughput parameter can be handled, and WO2009/082329 which discloses how release of common resources can be provided.

Thus, it still presents a problem to further improve the performance for both the communication network and/or the UE, while still employing and taking into account the requirements of one or more of the states URA_PCH, CELL_PCH, CELL_FACH and CELL_DCH.

SUMMARY

It is an object of the invention to at least partly overcome one or more of the limitations outlined above. In particular, it is an object to provide methods that may support increased overall network performance when a user equipment is in a certain state.

Hence a method for a user equipment (UE) for wireless communication with a base station is provided. The method is performed when the UE operates in a CELL_FACH state while transmitting user data over a first carrier, and comprises receiving from the base station a message indicative of a second carrier to be used for the user data transmission. When the message is received the user data transmission is transferred from the first carrier to the second carrier, in response to the message.

The method is advantageous e.g. in that it may provide a possibility to e.g. balance the carrier usage in a wireless communication system that the UE and the base station are part of. Hence the method may enable more efficient carrier resource utilization which in turn may provide a higher end-user performance (data rate) and/or higher system capacity.

Some embodiments of the method may comprise receiving from a base station a time value indicative of when the user data transmission shall be transferred from the first carrier to the second carrier, and/or may comprise receiving from a base station a time value indicative of a latest time for when the user data transmission shall be transferred from the first carrier to the second carrier. The base station from which the times value(s) is received may be the base station that sends the message indicative of a second carrier, but may also be another base station.

The user data transmission may be transferred from the first carrier to the second carrier when the user data transmission has been inactive for a predetermined period of time.

According to some embodiments, the method may also comprise receiving a restriction indication that prevents, until a predetermined condition is fulfilled, the user equipment from transferring the user data transmission from the second carrier to another carrier. The UE may determine a third carrier to be used for the user data transmission and may, when the predetermined condition is fulfilled, transfer the user data transmission from the second carrier to the third carrier.

The predetermined condition may e.g. comprise that of a predetermined period of time has lapsed since the message indicative of the second carrier was received, that a quality measure of the second carrier has fallen below a predetermined threshold level, and/or that a quality measure of the third carrier exceeds a predetermined threshold level.

The message indicative of the second carrier may e.g. be received in form of a layer 2 order or a Radio Resource Control (RRC) order. The message indicative of the second carrier may e.g. also be received over an E-DCH Absolute Grant Channel (E-AGCH) or a High Speed Shared Control Channel (HS-SCCH).

The user data transmission may according to some embodiments be performed over both the first carrier and the second carrier for a predetermined period of time from when the transfer of the user data transmission occurred.

Moreover, user data transmission and reception awareness over the second carrier may be initialized while the user data transmission is still performed over the first carrier. This is typically done for a predetermined period of time from when the message was received. The initialization of data transmission and reception awareness may prepare a channel (that is using the second carrier) for user data transmission. The initialization should preferably not include transmission of user data and is generally performed only for a short time. The predetermined period of time for transmission over both the first and second carrier may be longer than the average time for initializing user data transmission and reception awareness. When the predetermined period of time has expired, the user data transmission may be transferred from the first carrier to the second carrier.

According to another aspect a method is provided for a base station which communicates wirelessly with a user equipment that operates in a CELL_FACH state and performs user data transmission over a first carrier. The method for a base station comprises sending to the user equipment a message indicative of a second carrier to be used for the user data transmission, to enable the user equipment to transfer the user data transmission from the first carrier to the second carrier in a response to the message.

Some embodiments of the method for a base station may comprise performing load balancing for a set of carriers to determine a preferred carrier from a load perspective, and selecting the determined preferred carrier as the second carrier to be used for the user data transmission.

Other embodiments of the method for a base station may comprise one of more features that correspond to the features discussed in connection with the method for a user equipment.

According to another aspect a user equipment is provided for wireless communication with a base station. The user equipment is configured to, when operating in a CELL_FACH state and performing user data transmission over a first carrier, receive from the base station a message indicative of a second carrier to be used for the user data transmission. When the message is received the user data transmission is, in response to the message, transferred from the first carrier to the second carrier. The user equipment may be configured to implement any features discussed in connection with the method for a user equipment, and shares the corresponding advantages.

According to still another aspect a base station is provided for wireless communication with a user equipment. The base station is configured to, when the user equipment operates in a CELL_FACH state and performs user data transmission over a first carrier, send to the user equipment a message indicative of a second carrier to be used for the user data transmission. When the message is sent the user equipment can transfer the user data transmission from the first carrier to the second carrier, in response to the message. The base station may be configured to implement any features discussed in connection with the method for a base station, and shares the corresponding advantages.

Still other objectives, features, aspects and advantages of the invention will appear from the following detailed description, from the attached claims as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figures 1, 2:
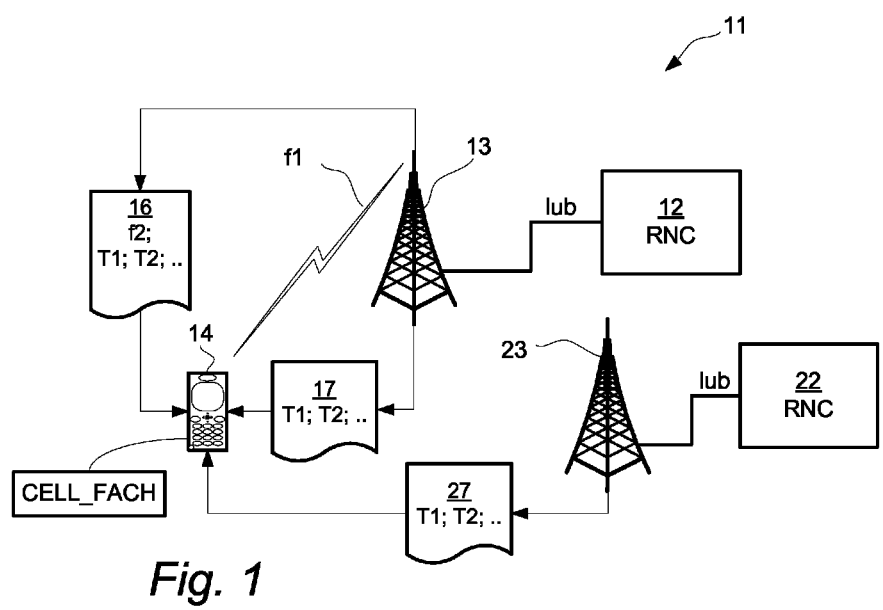
FIG. 1 is a schematic block diagram illustrating a telecommunications system with a base station that communicates with a user equipment in CELL_FACH state.
FIG. 2 is a view of an aggregated frequency spectrum used by the communication system of FIG. 1.

With reference to FIG. 1 an embodiment of a telecommunications system 11 is partially illustrated. The telecommunications system 11 implements WCDMA (Wideband Code Division Multiple Access) as specified by 3rd Generation Partnership Project (3GPP), and includes a UMTS Terrestrial Radio Access Network (UTRAN) with a number of base stations and Radio Network Controllers (RNCs), such as base station 13 and RNC 12. The base station 13 and the RNC 12 are connected via a Iub interface and may be embodied as a unitary device.

The base station 13 can communicate with a number of user equipments such as user equipment (UE) 14. The communication utilizes a radio interface which includes communication over several carriers (multi-carrier), where a carrier may be referred to as a waveform that is modulated with an input signal for the purpose of conveying information between a UE and a base station. Wireless communication utilizing multi-carries is known per se, and is by the telecommunications system 11 performed according to known standards and techniques.

A Radio Resource Control (RRC) protocol as specified by 3GPP TS 25.331 may be implemented to handle the signaling between the UE 14 and the base station 13. RRC signaling can then be used for moving the UE between the states CELL_DCH, CELL_FACH, CELL_PCH and URA_PCH.

For the method described below, the UE 14 is in the CELL_FACH state and user data transmission between the base station 13 and the UE 14 is initially performed over a first carrier f1. Additionally or alternatively, the user data transmission may be performed between the UE 14 and another base station, such as base station 23 that is connected to RNC 22. However, the user data transmission is still performed over the first carrier f1. The user data is typically data associated with a service provided to the user of the UE, such as speech, audio, video and application data transfer.

In detail and with reference to FIG. 2, the base station 13 and the UE 14 employs multi-carrier transmission of user data which enables the user to transmit on multiple 5 MHz carriers, for example on the first carrier f1, on a second carrier f2, on a third carrier f3 and on any further carrier that that is available for user data transmission. This may increase a peak rate, since a connection between the UE 14 and the base station 13 can utilize the peak rate of each 5 MHz carrier. Each of the carries can use HSPA (High Speed Packet Access) and supports data transmission rates (downlink/uplink) of e.g. 42/11 Mbps, which is sufficient for many common transmission scenarios when the UE 14 is in the CELL_FACH state.

When the UE 14 is in the CELL_FACH state the UE 14 is in control of the carrier selection, i.e. the telecommunications system 11 is then generally incapable of selecting/controlling which carrier a wireless connection between the UE 14 and base station 13 should use for transferring user-data. However, turning back to FIG. 1, a new type of message 16 is implemented which can be sent from the base station 13 to the UE 14. The message 16 holds information about a carrier, such as the second carrier f2, to be employed for the user data transmission. When the UE 14 has received the message 16 it transfers the user data transmission from the first carrier f1 to the second carrier f2. Also, the base station 13 or another base station, e.g. the base station 23, can send one or more additional messages to the UE 14, such as e.g. a further message 17 or 27 with various control parameters to the UE 14, as will be described in detail below.

Being in CELL_FACH state is advantageous for the UE 14 in that its energy consumption is relatively low, while still providing a reasonable rate of data transmission. Moreover, transferring the user data transmission to the second carrier f2 may provide for a more balanced load and improved resource distribution between carriers.

The UE 14 must not always be in the CELL_FACH state but may enter the other states CELL_DCH, CELL_PCH and URA_PCH. However, the UE is in the CELL_FACH state when user data transmission is transferred from the first carrier f1 to the second carrier f2 in response to the message 16.

Figure 3:
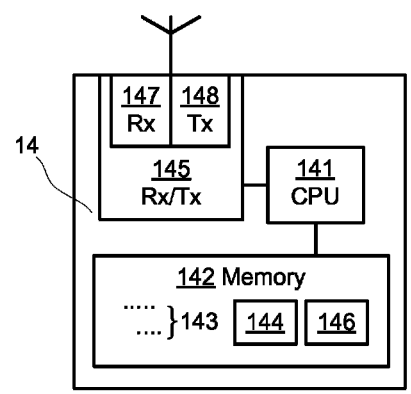
FIG. 3 is a schematic block diagram illustrating the user equipment of FIG. 1.

With reference to FIG. 3 an embodiment of the UE 14 is illustrated in further detail. The UE 14 comprises a processing unit 141 (CPU) that is connected to and controls a receiver 147 (Rx) and a transmitter 148 (Tx) that in this exemplary embodiment are combined in a common transceiver unit 145 (Rx/Tx).

A computer readable medium (Memory) 142 in the form of e.g. a flash memory, a hard disk or an EEPROM (Electronically Erasable Programmable Read-only Memory) is connected to the processing unit 141, and a computer program 143 having software instructions implementing one or more software applications are stored on the computer readable medium 142. The computer readable medium 142 can also store e.g. the transmitted user data and various control parameters, and the software instructions 143 typically include software instructions that implement the functionality for the UE 14 described herein. The software instructions may include a module 144 for monitoring a rate of user data transfer and which can be employed by the processor unit 141. Also, the processor unit 141 can determine a current time t, as common for most user equipments.

The UE 14 can determine a third carrier that is more proper for the user data transmission. For this purpose the software instructions 143 in the computer readable medium 142 may include a module 146 that is capable of calculating if another carrier is better (e.g. in respect of a data transfer rate) than the second carrier f2. Then the output produced by the module 146 includes a quality measure for the relevant carrier. Also, the module 146 can take a carrier as input and output an associated quality measure.

The UE 14 is in addition implemented according to common standards and protocols within the field of wireless communication based on e.g. WCDMA technology. This may include support for Enhanced Uplink (EUL) in CELL_FACH and CELL_FACH on High Speed Downlink Packet Access (HSDPA). Also, the wireless communication typically comprises multi-carrier communication, and the UE 14 sends and receives via the transceiver unit 145 user data and receives messages like messages 16 and 17.

The software instructions 143, i.e. a computer program code for carrying out the operations of the UE 14 described herein may for development convenience be written in a high-level programming language such as Java, C, and/or C++ but also in other programming languages, such as, but not limited to, interpreted languages. Some modules or routines for the operation of the UE 14 may be written in assembly language or micro-code to enhance performance and/or memory usage. It will be further appreciated that functional steps performed by the UE 14 may be implemented by using one or more processor, such as e.g. the processing unit 141, discrete hardware components, one or more application specific integrated circuits, signal processor or microcontroller.

Figure 4:
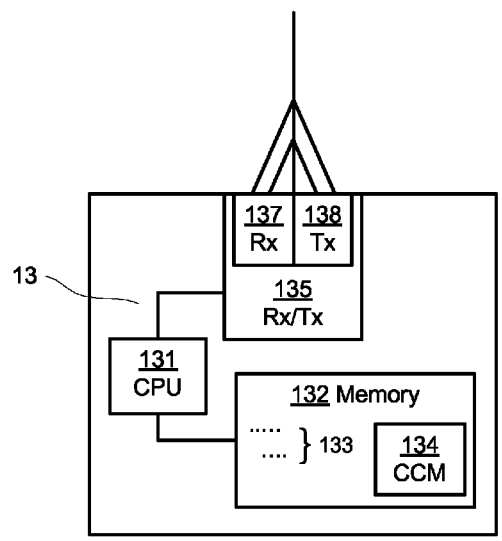
FIG. 4 is a schematic block diagram illustrating the base station of FIG. 1.

With reference to FIG. 4 an embodiment of the base station 13 is illustrated in further detail. The base station 13 comprises a processor unit 131 in the form of a central processing unit (CPU) to which a computer readable medium 132 similar to that of the UE 14 is connected. A computer program 133 is stored on the computer readable medium 132 and comprises software instructions that implement the functionality for the base station 13 described herein.

More specifically, the computer readable medium 132 comprises a carrier calculation module (CCM) 134 that includes functionality for determining which of the carriers f1-f3 or any other available carrier that should be used the user data transmission to/from the UE 14. This determination is based on load balancing that optimizes system resources as seen from a perspective of the telecommunications system 11 or a part thereof. The load balancing of the a carrier calculation module 134 can per se be implemented according to suitable techniques, for example as described in the paper "Carrier Load Balancing Methods with Bursty Traffic for LTE-Advanced Systems", Yuanye Wang et al, published by Aalborg university et al., or as described in "Dynamic load balancing in a CDMA system with multiple carriers", published at Vehicular Technology Conference, 2001. VTC 2001 Fall. IEEE VTS 54th. The result of the load balancing is a preferred carrier, which in this example is illustrated by the second carrier f2. The second carrier f2 is included in the message 16 when the message 16 is generated by the base station 13.

The base station 13 also comprises a receiver 137 (Rx) and a transmitter 138 (Tx) that are combined in a common transceiver unit 135 (Rx/Tx), which is controlled by the processor unit 131 and which can communicate with the transceiver unit 145 in the UE 14.

The base station 13 is in addition implemented according to common standards and protocols within the field of wireless communication based on e.g. WCDMA technology, and may include support for Enhanced Uplink (EUL) in CELL_FACH and CELL_FACH on High Speed Downlink Packet Access (HSDPA). Also, the wireless communication supported by the base station 13 typically comprises multi-carrier communication.

The software instructions 133, i.e. a computer program code for carrying out the operations performed by the base station 13 described herein may for development convenience be written in a high-level programming language such as Java, C, and/or C++ but also in other programming languages, such as, but not limited to, interpreted languages. Some modules or routines for operation of the base station 13 may be written in assembly language or micro-code. Any or all of the functional steps performed by the base station 13 may be implemented by using one or more processor, such as e.g. the processing unit 131, discrete hardware components, one or more application specific integrated circuits, signal processor or microcontroller.

Figure 5:
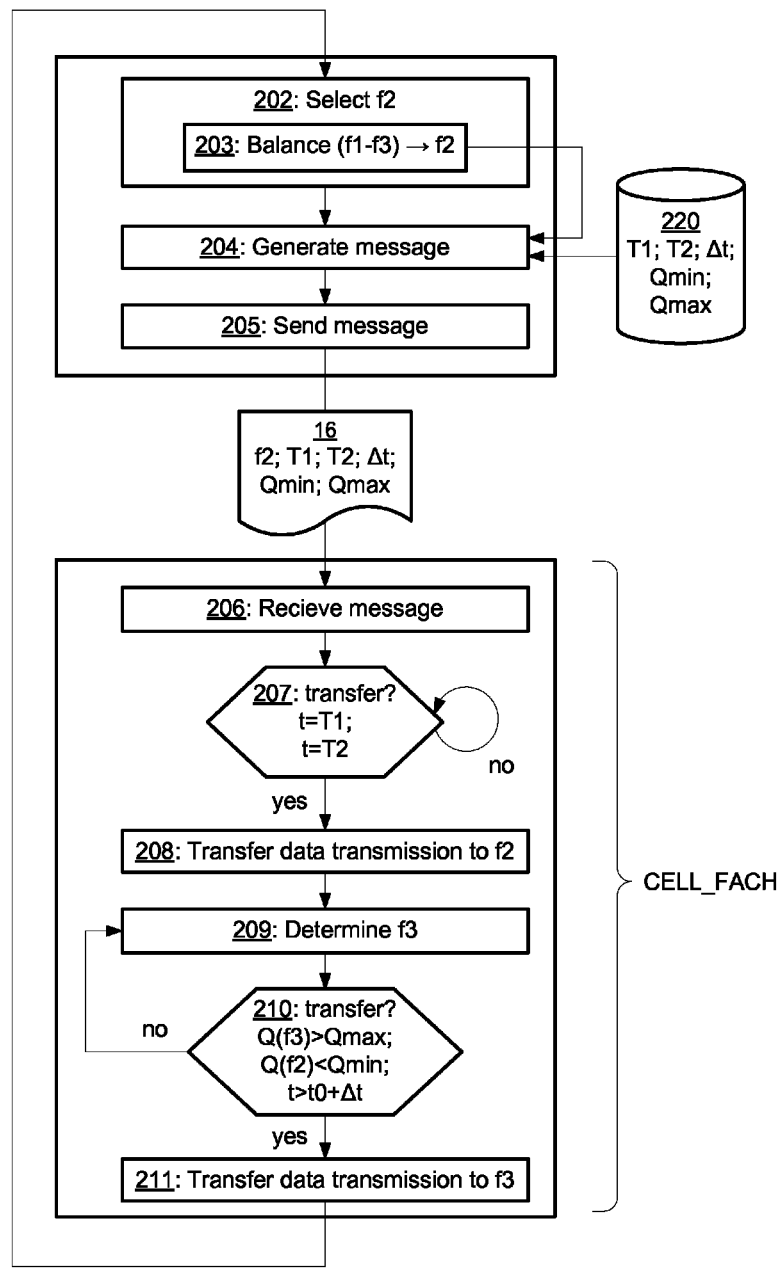
FIG. 5 is a flow chart of an embodiment of methods performed by the user equipment and the base station of FIG. 1.

With reference to FIG. 5, the method that causes the UE 14 to transfer user data transmission to another carrier is shown. During the whole process, the UE 14 is in the CELL_FACH state, and transmits initially user data over the first carrier f1. In this context, the user data transmission may be bursty in the sense that it is not continuously performed. However, during the described method the UE 14 operates in the CELL_FACH state, and user data transmission is typically performed between the UE 14 and one base station, such as base station 13.

In a first step 202 the processor unit 131 of the base station 13 utilizes the carrier calculation module 134 for selecting a carrier that is suitable from a load perspective. In this example the suitable carrier is the second carrier f2, but it could be any other available carrier as determined by the carrier calculation module 134. Specifically, the processor unit 131 may determine the second carrier f2 by performing a step 203 of balancing a load between the set of carries f1-f3, which set comprises the first carrier f1 and the second carrier f2. The second carrier f2 is thus selected based on the result of the load balancing, i.e. the second carrier f2 is selected as a function of the load balancing. Obviously, the UE 14 is not in control of the selection of the second carrier f2.

In a next step 204 the processor unit 131 of the base station 13 generates the message 16 that includes an indication of the second carrier f2. The message 16 can be referred to as a "Carrier Change Order", and its principal generation and layout may correspond to other messages that can be sent from the base station 13 to the UE 14, such as those messages specified in 3GPP TS 25.331. The generation of the message 16 includes extracting from a database 220 control parameters like times values T1, T2, Δt and quality thresholds Qmin, Qmax. The database 220 can be implemented on e.g. the computer readable medium 132 of the base station 13 or on another memory unit, while the control parameters T1, T2, Δt, Qmin, Qmax can be used for determining when user data transmission shall be transferred from one carrier to another. The values of the control parameters may typically be set by an operator of the telecommunication system 11, and may be included in the message 16.

In a next step 205 the processor unit 131 of the base station 13 uses the transceiver unit 135 to send the message 16 to the UE 14, i.e. the transceiver unit 135 sends to the UE 14 the message 16 that indicates the second carrier f2 to be used for the user data transmission. This is, as indicated, done when the UE 14 is in the CELL_FACH state, and the message 16 may include the control parameters T1, T2, Δt, Qmin, Qmax. In detail, the transceiver unit 135 of the base station 13 may send the message 16 to the transceiver unit 145 of the UE 14 as a layer 2 order, e.g. over the E-DCH Absolute Grant Channel (E-AGCH) or over the High Speed Shared Control Channel (HS-SCCH). Other channels may however be used for the transmission of the message 16.

In a next step 206 the UE 14, or more specifically the transceiver unit 145 of the UE 14, receives from the base station 13 the message 16. The sending of messages from the base station 13 and the receiving by the UE 14 is per se done in a manner common within the field of WCDMA. The receiving of the message includes extraction of any control parameters in the message 16, such as the time values T1, T2, Δt and quality thresholds Qmin, Qmax, which then can be used in subsequent steps.

In a next step 207 the UE 14 determines if a condition is fulfilled. The condition can be, for example, that the time value T1 corresponds to a current time t. The time value T1 can be a time after the transmission of the message 16, or can be a value that indicates that the transfer of the data transmission should be carried out immediately.

The condition to be fulfilled in step 207 can also be, for example, that a current time t has not reached a latest time, represented by T2, for when the user data transmission shall be transferred from the first carrier f1 to the second carrier f2. This condition can be combined with further conditions, such as an interruption or a relative decrease in user data transmission. This provides a possibility for the UE 14 to determine a point in time suitable for the transfer, i.e. somewhere between the receipt of the message 16 and the time value T2. The further condition can include the user data transmission being inactive for a predetermined period of time defined by an operator of the telecommunication system, such as a time of 10-500 ms which may be referred to as a "Session Timeout". Thus, it can be assured that that carrier selection does not impact an ongoing user data transmission but instead impacts the next or no transmission session for the connection.

The step 207 may be omitted such that the user equipment is configured to execute the transfer of user data transmission with no delay.

A next step 208 is performed when the condition of step 207 is fulfilled or if step 207 is omitted. In this step 208 the processing unit 141 of the UE 14 transfers the transmission of user data from the first carrier f1, to the second carrier f2. Specifically, the processing unit 141 may order the transceiver unit 145 to transfer the user data transmission from the first carrier f1 to the second carrier f2, as a response to the message 16, even though the UE 14 is in the CELL_FACH state. This allows the UE 14 to be controlled by via the base station 13 and the message 16, which represents one major difference from e.g. conventional handover where a possible change of carriers is ordered or caused by the UE. Thus, the method is in contrast with known technology where the UE is responsible for carrier selection when the UE is in the CELL_FACH state.

The transferring of the user data transmission from the first carrier f1 to the second carrier f2 may be done instantaneously, i.e. user data transmission over the second carrier f2 may begin after or at the very moment the data transmission over the first carrier f1 has stopped. However, the transmission may be performed over both carriers f1, f2 for a period of time. Herein the "transfer" of the user data transmission can also be understood as moving, switching or changing the transportation of user data from the first carrier f1 to the second carrier f2. In any case, both the first carrier f1 and the second carrier f2 may be used by the same base station for the user data transmission, such as base station 13.

Also, user data transmission may be initialized for the second carrier f2 while the user data is still transmitted over the first carrier f1. Once the initialization is complete the UE 14 may transfer the user data transmission to the second carrier f2. Thereby a possible slack in the execution performed by the UE 14 may be taken into account. In this case user data transmission may be performed over one carrier at time.

In a next step 209 the UE 14 uses the module 146 for determining another carrier that is more proper for the user data transmission, which carrier is exemplified by the third carrier f3. The output from this step is the third carrier f3 and typically also a quality measure Q(f3) of the third carrier f3. However, the UE 14 is restricted from transferring the user data transmission to the third carrier f3. The restriction may be embodied by the time value Δt and/or by any of the quality thresholds Qmin, Qmax.

In a next step 210 the UE 14 determines if the user data transmission shall be transferred to the third carrier f3, i.e. if the restriction shall be lifted. As indicated, the restriction is received in form of Δt, Qmin and/or Qmax and prevents, until a predetermined condition is fulfilled, the user equipment 14 from transferring the user data transmission from the second carrier f2 to the third carrier f3.

The restriction is lifted when a predetermined condition is fulfilled, which can include, for example, at least one of i) lapse of a period of time, represented by Δt, since the message indicative of the second carrier f2 was received, ii) a quality measure Q(f2) of the second carrier f2 falling below the threshold level Qmin, iii) the quality measure Q(f3) of the third carrier f3 exceeding the threshold level Qmax, and iv) the quality measure Q(f3) of the third carrier f3 exceeding a quality measure Q(f2) of the second carrier f2 by a predetermined margin. The quality measure Q(f2) of the second carrier f2 can be determined by module 146 in the UE 14.

For the respective predetermined condition i-iv, the lapse of time alt. thresholds and margin can be empirically determined, and eventually represent a balance between a suitable load in the system (keep data transmission to the second carrier f2) and good signaling conditions for the UE 14 (move data transmission to the third carrier f3). If none of the predetermined conditions are fulfilled, step 209 may be repeated.

In a next step 211, if one or more of the conditions in step 210 is fulfilled, the UE 14 transfers the user data transmission to the third carrier f3. This transfer can be performed in a manner similar with the transfer of the user data transmission to the second carrier, performed by step 208.

After step 211 all steps 202-211 may be repeated, such that the UE 14 regularly receives a message that indicates a carrier to be used for user data transmission. The UE can then regularly in response to messages transfer the user data transmission from one carrier to another, even if the UE 14 is in the CELL_FACH state.

It is possible to omit steps 209-211, in which case the carrier to be used by the UE 14 is always determined by the content of the message 16. The method can then be repeated by entering step 202 after step 208.

As explained, steps 202-205 are performed by the base station 13 while steps 206-211 are performed by the UE 14. Some of the steps 202-205 performed by the base station 13 may comprise that these steps 202-205 are performed by e.g. a control unit in the RNC 13 and/or in the telecommunications system 11.

Operations above performed in respect of quality thresholds may comprise operations performed on signal strength thresholds that are compared with signal strength values of the carriers. This is based on the realization that the relationship between quality and signal strength of a carrier is generally proportional.

As described, the control parameters T1, T2, Δt, Qmin and Qmax can be sent via the message 16. Alternatively or additionally, these control parameters can be sent to the UE 14 via any of the further message 17 and 27. Thus, each of the further messages 17, 27 may comprise any of the control parameters T1, T2, Δt, Qmin and Qmax.

The further message 17 can then be sent from the base station 13 to the UE 14 in a manner that corresponds to the transmission of the message 16 that indicates the second carrier f2. Also, the base station 23 can send its further message 27 in a corresponding manner, and their respective generation and transmission can be similar with the generation/transmission of the message 16, with the difference that the carrier f2 is omitted. The further message 17 or 27 can be sent to the UE 14 at a point in time before the message 16 is received by the UE 14, for example as a Layer 2 order, in form of system broadcast information or in a UE connection set up session.

An advantage with the base station 13 and/or the UE 14 is that the telecommunications system 11 is provided with a possibility to more efficiently utilize the carrier resources for multi-carrier connections, which can include carrier resource and load balancing for a significant part of the data transmission, even though the UE is in the CELL_FACH state. This may facilitate improved system performance which may e.g. provide for a more balanced load and improved resource situation between carriers.

For illustrating a non-limiting example of the message 16 reference is made to Table 1 below. The message is here referred to as "Carrier Change Order", and its principal layout may correspond to other messages that can be sent from the base station 13 to the UE 14, such as those specified in 3GPP TS 25.331. Thus, the meaning of "Information Element/Group Name", "Type and reference" and "Semantics description" can be the same as in 3GPP TS 25.331. Of course, other Information Elements may be added to the message illustrated by Table 1.

TABLE 1

| Information Element/Group Name | Type and reference | Semantics description |
| --- | --- | --- |
| Carrier Change Order | Enumerated {default, f1, f2, f3, ...} | The carrier the UE should transfer the user data transmission to, or "default" if normal UE carrier selection should be applied. |
| >Carrier Change Order Execution | Enumerated {"Exact time", "As fast as possible", "After session"} | Information determining when the carrier change order (specified by the message) should be initiated by the UE (may include e.g. T1 and T2 described above). |
| >>Session Timeout | Integer {10, 20, 50, 100, 200, 500} | The continuous time (ms) of data inactivity that determines the end of the session. |
| >>Carrier Change Order Time | Integer {0 ... 4095} | The SFN (System Frame Number) time when the carrier change order should be applied (an alternative to T1 and T2). |
| >Carrier Selection Threshold Q | Integer {−24 ... 0} | Quality threshold for the carrier pointed out in the Carrier Change Order, above which the UE should not select another carrier even if it has a better quality (may include e.g. Qmin). |
| >Cell Selection Threshold S | Integer {−120 ... 10} | Signal strength threshold for the carrier pointed out in the Carrier Change Order, above which the UE should not select another carrier even if it has a better signal strength (an alternative to e.g. Qmin). |

By virtue of the Carrier Change Order the message 16 indicates in this example the carrier to be used for the user data transmission. The Carrier Change Order or a similar information element that indicates at least a carrier to which the user data transmission shall be transferred should always be included in the message 16. However, the other information elements are optional.

The message 16 can be seen as an order or a set of data that provides information about which carrier the UE 14 shall use for user data transmission. Also, the message 16 serves the intentional purpose of transferring the user data transmission from the first carrier to the second carrier. Thus, the transfer of the user data transmission from the first carrier f1 to the second carrier f2 can not be seen as e.g. a side effect of some other type of order that might affect which carrier is used. Also, as is obvious the message 16 is not generated by the UE 14, but by another entity of a communication network the UE 14 and base station 13 are part of.

The steps or parts of the steps described herein can be seen as performed by a combination of several entities within the UE respectively the base station. Also, some steps or parts of some steps performed by the base station can be performed by the RNC or by the telecommunication system the base station and RNC are part of. The RNC and telecommunication system includes for this purpose at least one processor unit. Accordingly, some steps and functions or parts thereof performed by the base station herein comprise the possibility that the same steps or parts thereof are performed by the RNC and/or by the telecommunication system.

Thus, although various embodiments of the invention have been described and shown, the invention is not restricted thereto, but may also be embodied in other ways within the scope of the subject-matter defined in the following claims.

The invention claimed is:

1. A method for a user equipment adapted for wireless communication with a base station, the method comprising, when the user equipment operates in a CELL_FACH state and performs user data transmission over a first carrier:
   receiving, from the base station, a message indicative of a second carrier to be used for the user data transmission,
   transferring the user data transmission from the first carrier to the second carrier, in response to the message,
   receiving a restriction indication that prevents, until a predetermined condition is fulfilled, the user equipment from transferring the user data transmission from the second carrier to another carrier,
   determining a third carrier to be used for the user data transmission, and
   transferring the user data transmission from the second carrier to the third carrier when the predetermined condition is fulfilled,
   wherein the step of receiving the message indicative of the second carrier to be used for the user data transmission further comprises:
      receiving the message indicative of the second carrier in form of a layer 2 order, and
      receiving the message indicative of the second carrier over an E-DCH Absolute Grant Channel or a High Speed Shared Control Channel.

2. A method according to claim 1, comprising receiving from a base station a time value indicative of when the user data transmission shall be transferred from the first carrier to the second carrier.

3. A method according to claim 1, comprising receiving, from a base station, a time value indicative of a latest time for when the user data transmission shall be transferred from the first carrier to the second carrier.

4. A method according to claim 1, comprising transferring the user data transmission from the first carrier to the second carrier when the user data transmission has been inactive for a predetermined period of time.

5. A method according to claim 1, wherein the predetermined condition comprises that a predetermined period of time has lapsed since the message indicative of the second carrier was received.

6. A method according to claim 1, wherein the predetermined condition comprises that a quality measure of the second carrier has fallen below a threshold level.

7. A method according to claim 1, wherein the predetermined condition comprises a quality measure of the third carrier exceeding a threshold level.

8. A method according to claim 1, wherein the user data transmission is performed over both the first carrier and the second carrier for a predetermined period of time from when the transfer of the user data transmission occurred.

9. A method for a base station which communicates wirelessly with a user equipment that operates in a CELL_FACH state and performs user data transmission over a first carrier, the method comprising:
   sending to the user equipment a message indicative of a second carrier to be used for the user data transmission, to enable the user equipment to transfer the user data transmission from the first carrier to the second carrier, in response to the message,
   wherein the step of sending the message indicative of a second carrier further comprises:
      sending the message indicative of the second carrier in form of a layer 2 order, and
      sending the message indicative of the second carrier over an E-DCH Absolute Grant Channel or a High Speed Shared Control Channel; and
   sending to the user equipment a restriction indication that prevents, until a predetermined condition is fulfilled, the user equipment from transferring the user data transmission from the second carrier to another carrier.

10. A method according to claim 9, further comprising performing load balancing for a set of carriers to determine a preferred carrier from a load perspective, and selecting the determined preferred carrier as the second carrier to be used for the user data transmission.

11. A method according to claim 9, comprising sending to the user equipment a time value indicative of when the user data transmission shall be transferred from the first carrier to the second carrier.

12. A method according to claim 9, comprising sending to the user equipment a time value indicative of a latest time for when the user data transmission shall be transferred from the first carrier to the second carrier.

13. A method according to claim 9, wherein the predetermined condition comprises that a predetermined period of time has lapsed since the message indicative of the second carrier was sent.

14. A method according to claim 9, wherein the predetermined condition comprises that a quality measure of the second carrier has fallen below a threshold level, the quality measure of the second carrier being determined by the user equipment.

15. A method according to claim 9, wherein the predetermined condition comprises the quality measure of a third carrier exceeding a threshold level, the quality measure of the third carrier being determined by the user equipment.

16. A method according to claim 9, comprising sending to the user equipment a message that indicates for how long time user data transmission shall be performed over both the first carrier and the second carrier.

17. A user equipment for wireless communication with a base station, the user equipment comprising a receiver and a processing unit configured to, when operating in a CELL_FACH state and performing user data transmission over a first carrier:
   receive from the base station a message indicative of a second carrier to be used for the user data transmission,
   transfer the user data transmission from the first carrier to the second carrier, in response to the message,
   receive a restriction indication that prevents, until a predetermined condition is fulfilled, the user equipment from transferring the user data transmission from the second carrier to another carrier,
   determine a third carrier to be used for the user data transmission, and
   transfer the user data transmission from the second carrier to the third carrier when the predetermined condition is fulfilled,
   wherein the message is in form of a layer 2 order, and the message is received over an E-DCH Absolute Grant Channel or a High Speed Shared Control Channel.

18. A user equipment according to claim 17, wherein the predetermined condition comprises that a predetermined period of time has lapsed since the message indicative of the second carrier was received.

19. A user equipment according to claim 17, wherein the predetermined condition comprises that a quality measure of the second carrier has fallen below a threshold level.

20. A user equipment according to claim 17, wherein the predetermined condition comprises a quality measure of the third carrier exceeding a threshold level.

21. A base station for wireless communication with a user equipment, the base station comprising a transmitter configured to, when the user equipment operates in a CELL_FACH state and performs user data transmission over a first carrier:

send to the user equipment a message indicative of a second carrier to be used for the user data transmission, such that the user equipment can transfer the user data transmission from the first carrier to the second carrier, in response to the message, wherein the message is in form of a layer 2 order, and the message is sent over an E-DCH Absolute Grant Channel or a High Speed Shared Control Channel, and send to the user equipment a restriction indication that prevents, until a predetermined condition is fulfilled, the user equipment from transferring the user data transmission from the second carrier to another carrier.

22. A base station according to claim 21, wherein the predetermined condition comprises that a predetermined period of time has lapsed since the message indicative of the second carrier was sent.

23. A base station according to claim 21, wherein the predetermined condition comprises that a quality measure of the second carrier has fallen below a threshold level, the quality measure of the second carrier being determined by the user equipment.

24. A base station according to claim 21, wherein the predetermined condition comprises the quality measure of a third carrier exceeding a threshold level, the quality measure of the third carrier being determined by the user equipment.

* * * * *

UNITED STATES PATENT AND TRADEMARK OFFICE
CERTIFICATE OF CORRECTION

PATENT NO. : 9,210,629 B2
APPLICATION NO. : 13/883719
DATED : December 8, 2015
INVENTOR(S) : Karlsson It is certified that error appears in the above-identified patent and that said Letters Patent is hereby corrected as shown below:

In the specification

Column 9, Line 36, delete "RNC 13" and insert -- RNC 12 --, therefor.

Signed and Sealed this
Twenty-ninth Day of March, 2016

Michelle K. Lee
*Director of the United States Patent and Trademark Office*